US012596572B2

(12) United States Patent
Gundluru

(10) Patent No.: US 12,596,572 B2
(45) Date of Patent: Apr. 7, 2026

(54) AUDIO MULTITHREADED PROFILING

(71) Applicant: DSP Concepts, Inc., Santa Clara, CA (US)

(72) Inventor: Madhan Mohan Gundluru, McKinney, TX (US)

(73) Assignee: DSP Concepts, Inc., Santa Clara, CA (US)

( * ) Notice: Subject to any disclaimer, the term of this patent is extended or adjusted under 35 U.S.C. 154(b) by 454 days.

(21) Appl. No.: 18/124,189

(22) Filed: Mar. 21, 2023

(65) Prior Publication Data

US 2024/0320040 A1     Sep. 26, 2024

(51) Int. Cl.
G06F 9/48        (2006.01)
G06F 1/08        (2006.01)

(52) U.S. Cl.
CPC .............. G06F 9/4887 (2013.01); G06F 1/08 (2013.01)

(58) Field of Classification Search
CPC .................................. G06F 9/4887; G06F 1/08
USPC .......................................................... 718/107
See application file for complete search history.

(56) References Cited

U.S. PATENT DOCUMENTS 6,098,169 A *  8/2000 Ranganathan ...... G06F 11/3466
                                                        702/182
6,212,544 B1 *  4/2001 Borkenhagen ........ G06F 9/3851
                                                        712/E9.032
6,622,253 B2 *  9/2003 Bacon ..................... G06F 1/324
                                                        712/E9.063

7,774,784 B2 *  8/2010 Fields ................. G06F 11/3423
                                                        718/107
7,802,255 B2 *  9/2010 Pilkington ............ G06F 9/3851
                                                        712/216
7,840,966 B2 * 11/2010 Dodge .................. G06F 9/4881
                                                        718/103
8,090,890 B2 *  1/2012 Rofougaran ...... H04M 1/72502
                                                        710/2
8,418,180 B2 *  4/2013 Bishop .................. G06F 9/3861
                                                        718/103
8,578,348 B2 * 11/2013 Fliess .................. G06F 11/3457
                                                        717/138
8,683,243 B2    3/2014 Wu et al.
9,390,258 B2 *  7/2016 Hanley ................... G06F 21/76

(Continued)

OTHER PUBLICATIONS

Walker, Martin, "Multi-core Processors For Musicians", PC Musician, https://www.soundonsound.com/sound-advice/multi-core-processors-musicians, (Jan. 1, 2008).

*Primary Examiner* — Alicia Baturay
(74) *Attorney, Agent, or Firm* — Schwegman Lundberg & Woessner, P.A.

(57)                ABSTRACT

A method of thread-level cycle processing includes determining a clock value at the start of execution of a first thread, receiving preemption of the first thread by a second thread; determining a clock value at the start and end of execution of the second thread, determining a duration of the second thread by subtracting the clock value at the start of execution of the second thread from the clock value at the end of execution of the second thread. A clock value at the end of execution of the first thread is then determined and a duration of the first thread is determined by subtracting the duration of the second thread from the difference between the clock value at the end of execution of the first thread and the clock value at the end of execution of the first thread.

20 Claims, 9 Drawing Sheets

(56) References Cited

U.S. PATENT DOCUMENTS

| | | | |
|---|---|---|---|
| 9,756,118 B2 * | 9/2017 | Taheri | H04L 43/00 |
| 10,026,145 B2 * | 7/2018 | Bourd | G06T 15/005 |
| 10,109,015 B2 * | 10/2018 | Sale | G06F 16/2379 |
| 10,114,645 B2 * | 10/2018 | Ogasawara | G06F 9/30079 |
| 10,133,602 B2 * | 11/2018 | Harris | G06F 9/5027 |
| 10,379,887 B2 | 8/2019 | Spracklen | |
| 10,445,271 B2 * | 10/2019 | Wang | G06F 9/3004 |
| 10,585,669 B2 * | 3/2020 | Ogasawara | G06F 9/3009 |
| 10,817,496 B2 * | 10/2020 | Deolalikar | G06Q 10/107 |
| 11,055,137 B2 * | 7/2021 | Gull | G06F 13/28 |
| 12,164,956 B2 * | 12/2024 | Chitnis | G06F 9/4887 |
| 12,277,441 B2 * | 4/2025 | Iqbal | G06F 1/08 |
| 12,279,155 B2 * | 4/2025 | Bhat | H04W 28/0268 |
| 2001/0056456 A1 * | 12/2001 | Cota-Robles | G06F 9/3851 |
| | | | 718/103 |
| 2012/0124582 A1 * | 5/2012 | Bello | G06F 9/4843 |
| | | | 718/100 |
| 2015/0281853 A1 * | 10/2015 | Eisner | H04R 25/505 |
| | | | 381/312 |
| 2015/0312116 A1 | 10/2015 | Taheri et al. | |
| 2017/0192921 A1 | 7/2017 | Wang et al. | |
| 2024/0403128 A1 * | 12/2024 | Sun | G06F 9/485 |

* cited by examiner

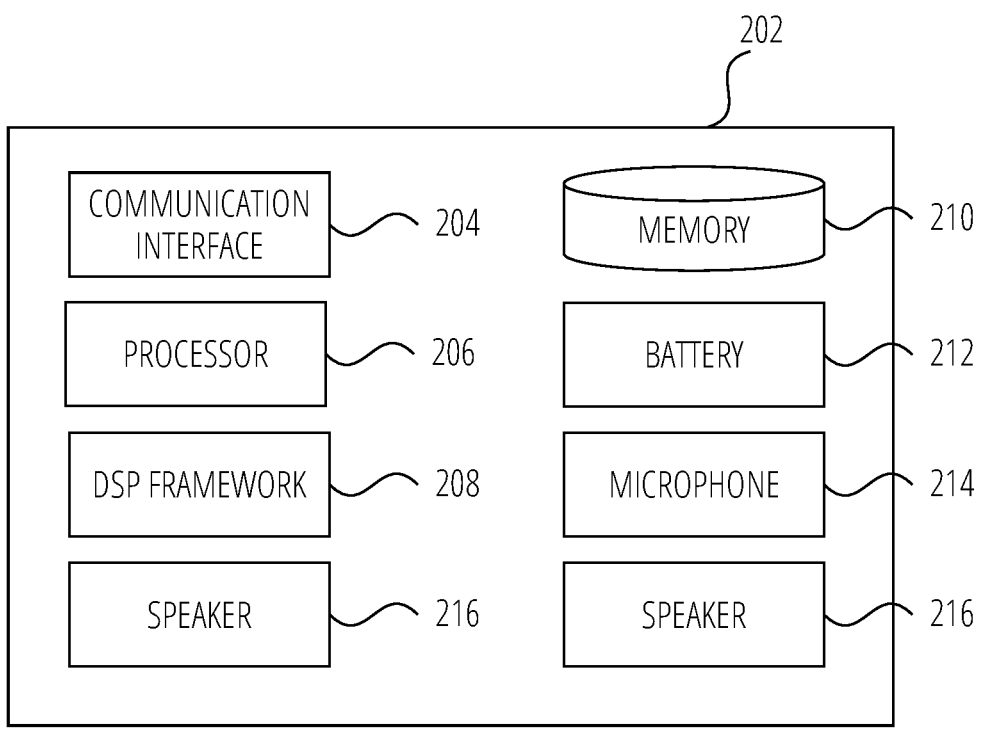
FIG. 2

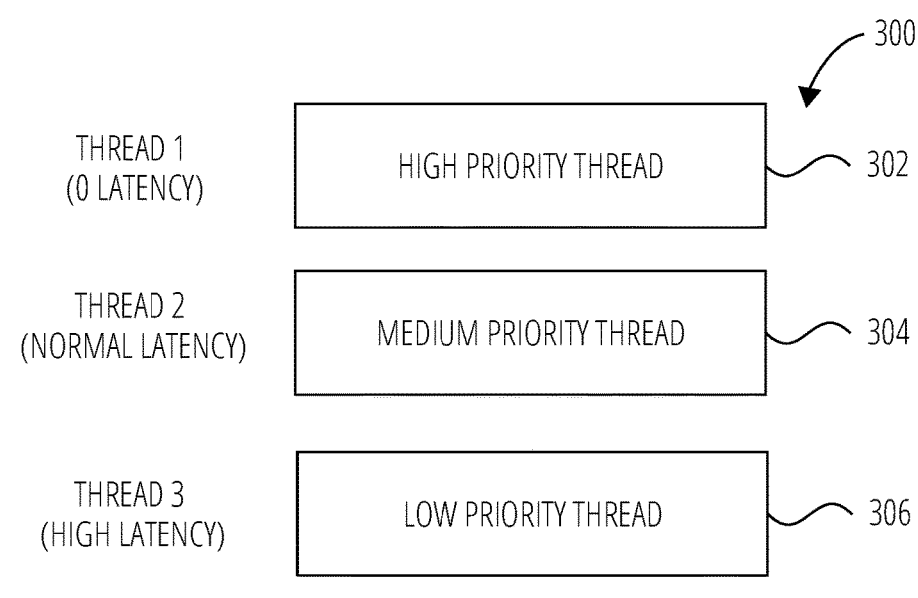
FIG. 3
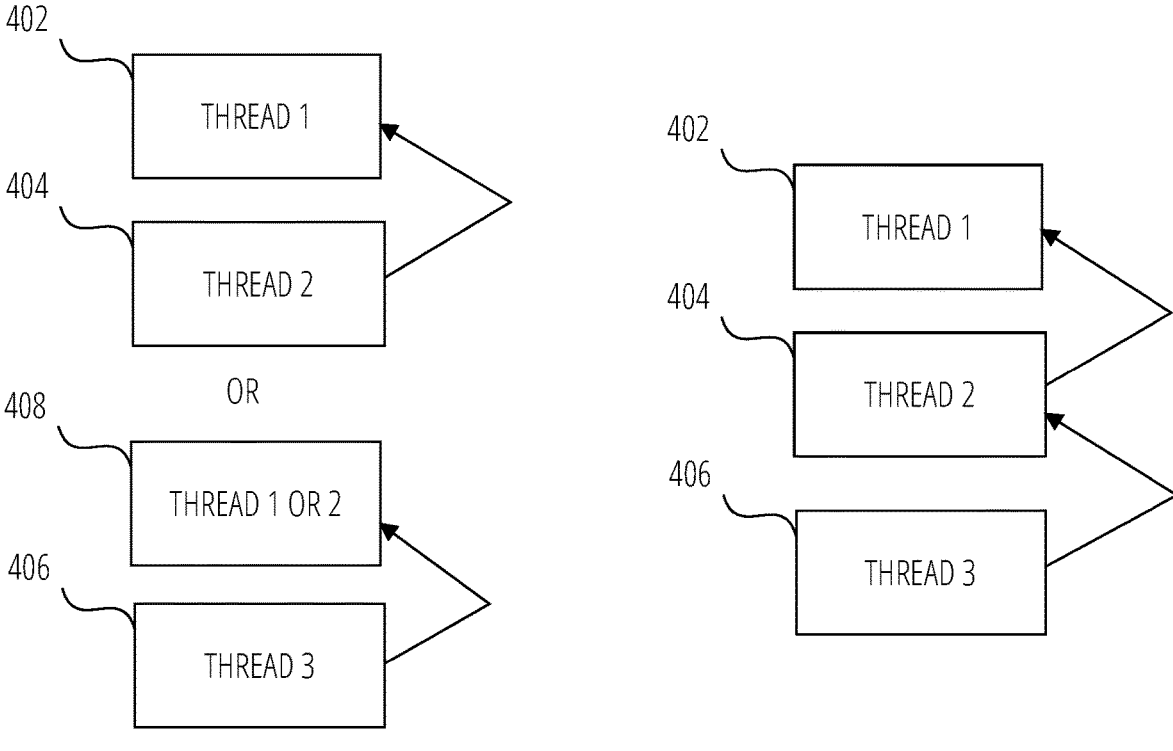
FIG. 4A                      FIG. 4B

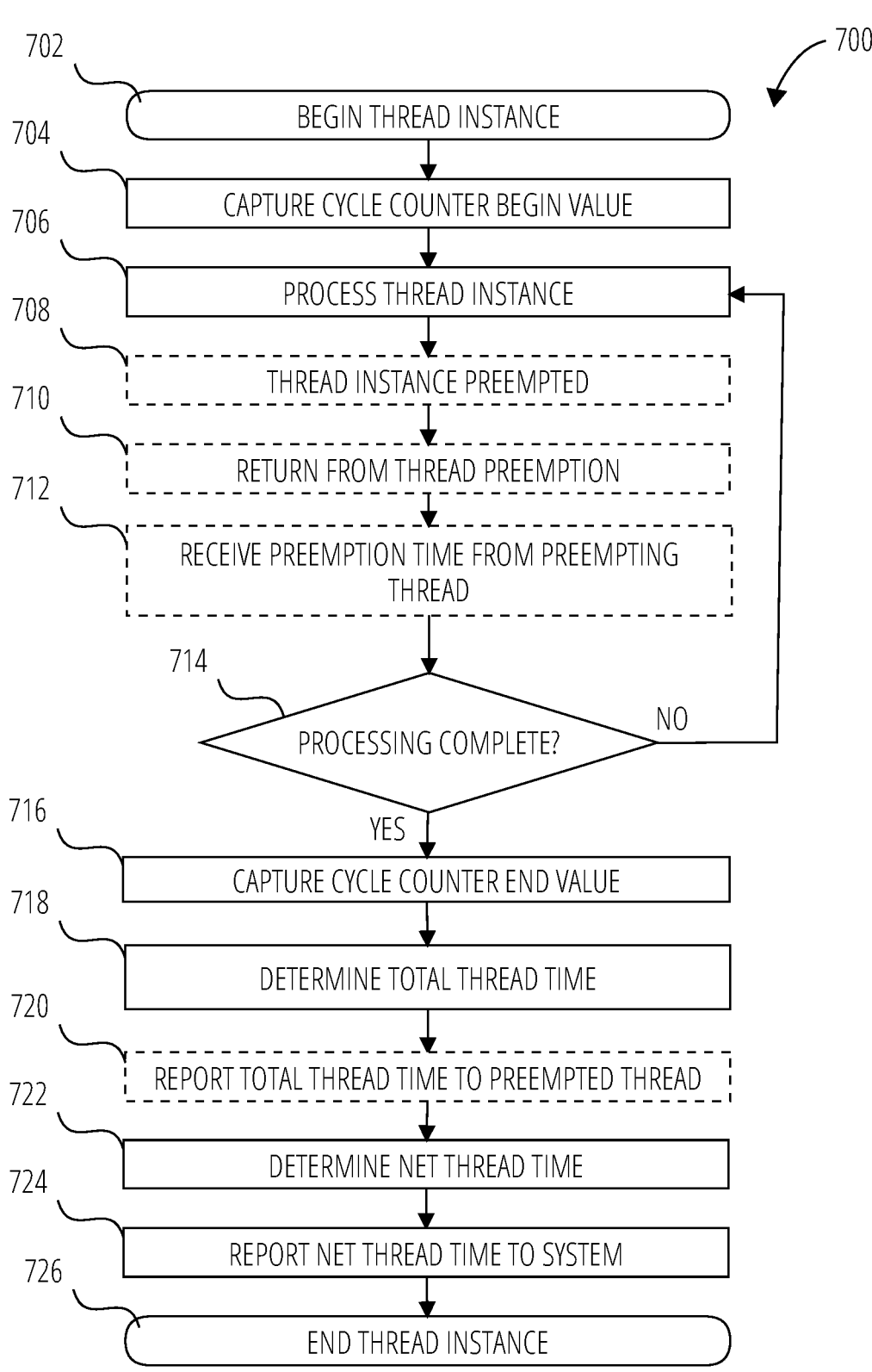

702 BEGIN THREAD INSTANCE

704 CAPTURE CYCLE COUNTER BEGIN VALUE

706 PROCESS THREAD INSTANCE

708 THREAD INSTANCE PREEMPTED

710 RETURN FROM THREAD PREEMPTION

712 RECEIVE PREEMPTION TIME FROM PREEMPTING THREAD

714 PROCESSING COMPLETE?    NO    YES

716 CAPTURE CYCLE COUNTER END VALUE

718 DETERMINE TOTAL THREAD TIME

720 REPORT TOTAL THREAD TIME TO PREEMPTED THREAD

722 DETERMINE NET THREAD TIME

724 REPORT NET THREAD TIME TO SYSTEM

726 END THREAD INSTANCE

AUDIO MULTITHREADED PROFILING

BACKGROUND

Current audio playback devices, such as headphones, laptops, earbuds, smart speakers and so forth, have become more sophisticated and connected. While the audio processing power that is available for use in such products has increased substantially, such devices may be multi-purpose devices and system resources may be shared with other functions and tasks. In order for developers of and for such products to be able to exploit the available audio processing capabilities, it is useful to provide an assessment of the processing power that is consumed by particular audio processes or modules.

BRIEF DESCRIPTION OF THE SEVERAL VIEWS OF THE DRAWINGS

Some example embodiments of the present disclosure are illustrated by way of example and not limitation in the figures of the accompanying drawings, in which like reference numbers indicate similar elements. To easily identify the discussion of any particular element or act, the most significant digit or digits in a reference number refer to the figure number in which that element is first introduced.

FIG. 2 illustrates the example wireless ear buds of FIG. 1 in more detail.

FIG. 3 illustrates a system with a layout including three processing threads, according to some examples.

FIG. 4A illustrates a scenario that may occur in the system of FIG. 3 as far as thread preemption is concerned, according to some examples.

FIG. 4B illustrates a scenario that may occur in the system of FIG. 3 as far as thread preemption is concerned, according to some examples.

FIG. 7 illustrates a flowchart for providing cycle profiling according to some examples.

DETAILED DESCRIPTION

Figure 1:
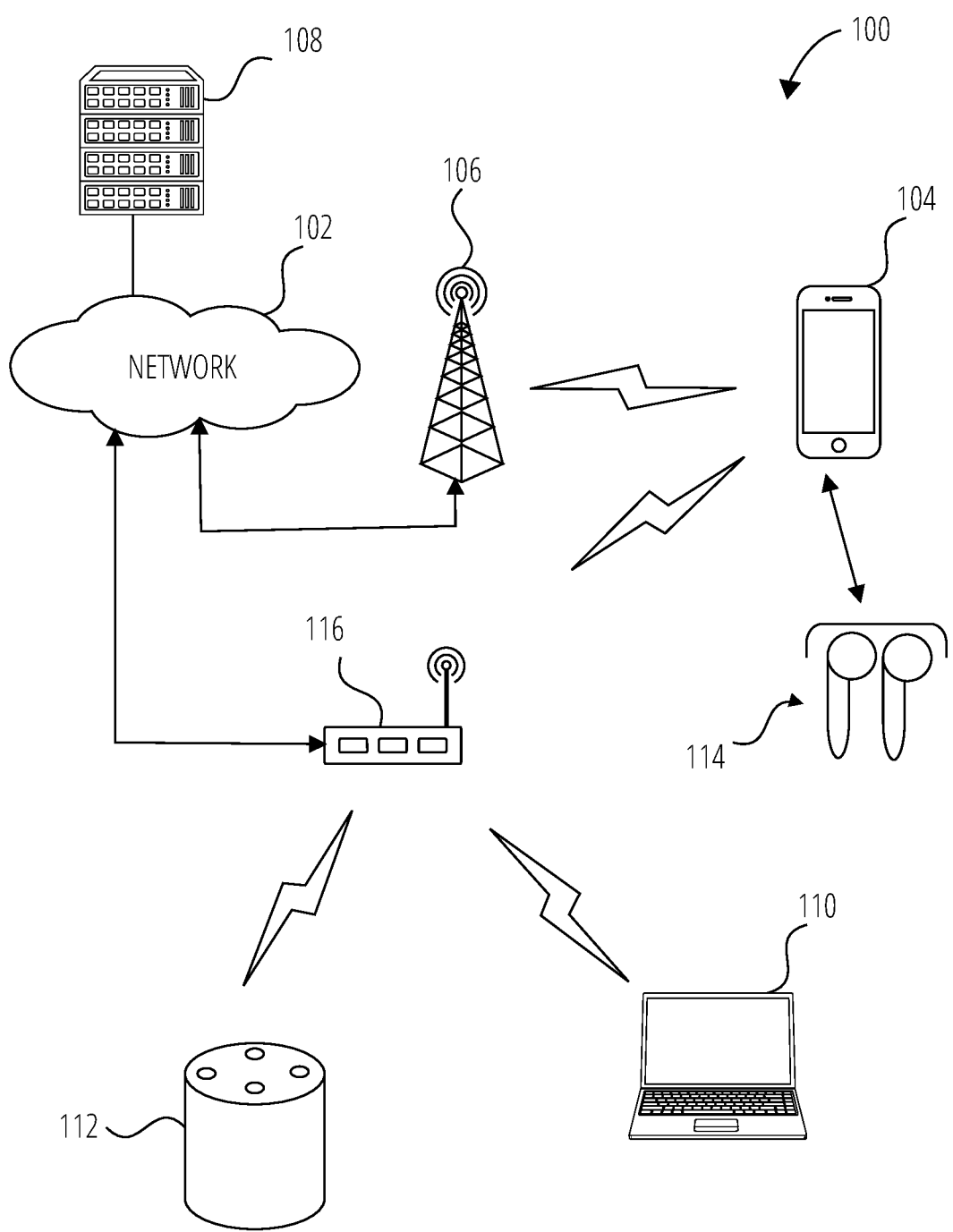
FIG. 1 illustrates an example of a system in which a mobile phone communicates with a remote device over a network.

Cycle profiling is generally used within DSP systems in order to determine the percentage of the processor's total processing power that is being used at any given time. This is important for understanding both the total processor load, as well as the impact of specific processes and various real-time situations on processor performance. Processors typically implement a cycle counter that increments on every tick of the processor clock. Basic profiling is achieved by comparing the value of the cycle counter at various points within the process execution cycle and knowing the processor's configured cycles/second capability.

Profiling on a single threaded system is easy since there is only one process per processor. A process starts, completes, and then starts again. The number of CPU cycles spent in the process is simply the value of the cycle counter when processing is done, minus the value of the cycle counter when the thread started, divided by the total number of cycles/second available. If there are multiple processes in a single-threaded system, they will all execute in series. Profiling of each individual process is a matter of simply recording multiple sets of cycle counter reads for the sequential threads.

Multithreading is commonly used to allow multiple processes to run "at the same time" on a single processor. One reason this is done is to allow for different priorities of execution, for example to support low latency processes such as Active Noise Control alongside large block size processing such as Audio EQ. In these cases, the larger processes are preempted (or paused) so that the more critical low latency processing can complete in time.

In multi-threaded systems there is still a single program counter, since only one processor exists. Therefore each process still has a single start and end cycle count. When preemption occurs, it is difficult to allocate the time spent between the various threads since a single profiling measurement will contain the time spent within all the threads, which may be related to entirely different processes. When profiling a process in a low priority thread, the result will contain time spent in the higher priority threads as well.

This issue can be handled manually by either profiling each process as a single thread in isolation, or applying calculated estimates of each process profile. Both of these methods can be inaccurate and inconsistent, however.

Disclosed herein is a method of addressing these issues by having a higher priority thread share its profiling information with a lower priority thread that was preempted by the operation of the higher priority thread. This permits the profiling information of the lower priority thread to account for the preemption by the higher priority thread.

The higher priority thread implements its own profiling; however, when processing reverts back to the lower priority thread, the profiling information of the higher priority thread is shared with the lower priority thread. The lower priority thread then knows how long the higher priority thread ran, and can eliminate this from the profiling of the lower priority thread by subtraction.

This concept is extendable to additional threads where each higher priority thread cascades the profiling information down.

According to some examples, provided is a method, executed by one or more processors, including determining a clock value at the start of execution of a first thread, beginning processing the first thread, receiving preemption of the first thread by a second thread, determining a clock value at the start of execution of the second thread, processing the second thread, determining a clock value at the end of execution of the second thread, determining a duration of the second thread by subtracting the clock value at the start of execution of the second thread from the clock value at the end of execution of the second thread, completing processing of the first thread, determining a clock value at the end of execution of the first thread, and determining a duration of the first thread by subtracting the duration of the second thread from a difference between the clock value at the end of execution of the first thread and the clock value at the start of execution of the first thread.

The method may further include, during processing of the second thread receiving preemption of the second thread by a third thread, determining a clock value at the start of execution of the third thread, processing the third thread, determining a clock value at the end of execution of the third thread, determining a duration of the third thread by subtracting the clock value at the start of execution of the third thread from the clock value at the end of execution of the third thread, completing processing of the second thread, determining a clock value at the end of execution of the second thread, and determining a duration of the second thread by subtracting the duration of the third thread from the difference between the clock value at the end of execution of the second thread and the clock value at the start of execution of the second thread.

The method may also include, during processing of the first thread receiving preemption of the first thread by a third thread, determining a clock value at the start of execution of the third thread, processing the third thread, determining a clock value at the end of execution of the third thread, determining a duration of the third thread by subtracting the clock value at the start of execution of the third thread from the clock value at the end of execution of the third thread, completing processing of the first thread, determining a clock value at the end of execution of the first thread, and determining a duration of the first thread by subtracting the duration of the second thread and the duration of the third thread from the difference between the clock value at the end of execution of the first thread and the clock value at the start of execution of the first thread.

The method may further include performing the aforementioned method steps over a predetermined interval having a specific duration, accumulating durations of the first thread and durations of the second thread that have been determined during the predetermined interval, determining a processor load for the first thread by dividing the accumulated duration of the first thread by the specific duration, determining a processor load for the second thread by dividing the accumulated duration of the second thread by the specific duration, and reporting the processor load for the first thread and the processor load for the second thread.

The method may also include performing the aforementioned method steps over a predetermined interval having a specific duration, accumulating durations of the first thread and durations of the second thread and durations of the third thread that have been determined during the predetermined interval, determining a processor load for the first thread by dividing the accumulated duration of the first thread by the specific duration, determining a processor load for the second thread by dividing the accumulated duration of the second thread by the specific duration, determining a processor load for the third thread by dividing the accumulated duration of the second thread by the specific duration, and reporting the processor loads for the first thread, the second thread and the third thread.

In some examples, provided is a non-transitory computer-readable storage medium, the computer-readable storage medium including instructions that when executed by a computer, cause the computer to perform operations including any of the methods set forth above, including but not limited to determining a clock value at the start of execution of a first thread, beginning processing the first thread, receiving preemption of the first thread by a second thread, determining a clock value at the start of execution of the second thread, processing the second thread, determining a clock value at the end of execution of the second thread, determining a duration of the second thread by subtracting the clock value at the start of execution of the second thread from the clock value at the end of execution of the second thread, completing processing of the first thread, determining a clock value at the end of execution of the first thread, and determining a duration of the first thread by subtracting the duration of the second thread from a difference between the clock value at the end of execution of the first thread and the clock value at the start of execution of the first thread.

In some examples, provided is a computing apparatus including a processor and a memory storing instructions that, when executed by the processor, configure the apparatus to perform operations including any of the methods set forth above, including but not limited to determining a clock value at the start of execution of a first thread, beginning processing the first thread, receiving preemption of the first thread by a second thread, determining a clock value at the start of execution of the second thread, processing the second thread, determining a clock value at the end of execution of the second thread, determining a duration of the second thread by subtracting the clock value at the start of execution of the second thread from the clock value at the end of execution of the second thread, completing processing of the first thread, determining a clock value at the end of execution of the first thread, and determining a duration of the first thread by subtracting the duration of the second thread from a difference between the clock value at the end of execution of the first thread and the clock value at the start of execution of the first thread.

Other technical features may be readily apparent to one skilled in the art from the following figures, descriptions, and claims.

FIG. 1 illustrates an example of a system 100 in which audio-capable devices such as a mobile phone 104, a computer 110, and a smart speaker 112 are coupled to a network 102 via a cell tower 106 or wireless router 116. The network 102 includes and one or more servers 108 that can provide data and functionality to the components of the system 100. Also illustrated are wireless ear buds 114 that may provide audio to and receive audio from the mobile phone 104 over a Bluetooth link.

FIG. 2 illustrates an example of one of the audio-capable device shown in FIG. 1. Each audio device 202 includes a communication interface 204 used to communicatively couple with the network 102 and/or with other local devices. The audio device 202 includes a battery 212 for converting audio data into audible sound, and one or more microphones 214 for generating ambient and speech signals.

The audio device 202 includes a DSP framework 208 for processing received audio signals and/or signals from the one or more microphones 214, to provide to the speaker 216 or to a remote user. The DSP framework 208 is a software stack running on a physical DSP core (not shown) or other appropriate computing hardware, such as a networked processing unit, accelerated processing unit, a microcontroller, graphics processing unit or other hardware acceleration. The DSP core will have additional software such as an operating system, drivers, services, and so forth. The audio device 202 includes a processor 206 and memory 210 for storing software, firmware and an operating system for operating the audio device 202.

FIG. 3 illustrates a system 300 with a layout including three processing threads, according to some examples. The system 300 includes a high priority thread 302, a medium priority thread 304 and a low priority thread 306. The high priority thread 302 may for example be a direct memory access (DMA) interrupt service request (ISR), while the medium priority thread 304 and the low priority thread 306 are audio processing threads.

FIG. 4A and FIG. 4B illustrate two scenarios that may occur in the system 300 of FIG. 3 as far as thread preemption is concerned, according to some examples. As shown in FIG. 4A, a lower priority thread may be preempted by a single higher priority thread. That is, thread 2 404 may be preempted by thread 1 402, or thread 3 406 may be preempted by either thread 1 or 2 408. As shown in FIG. 4B, in the second scenario, a lower priority thread, thread 3 406, may be preempted by a higher priority thread, thread 2 404, which may in turn be preempted by a still higher priority thread, thread 3 406. Traditionally, profiling the processor load relating to each thread in these situations is challenging.

Figure 5:
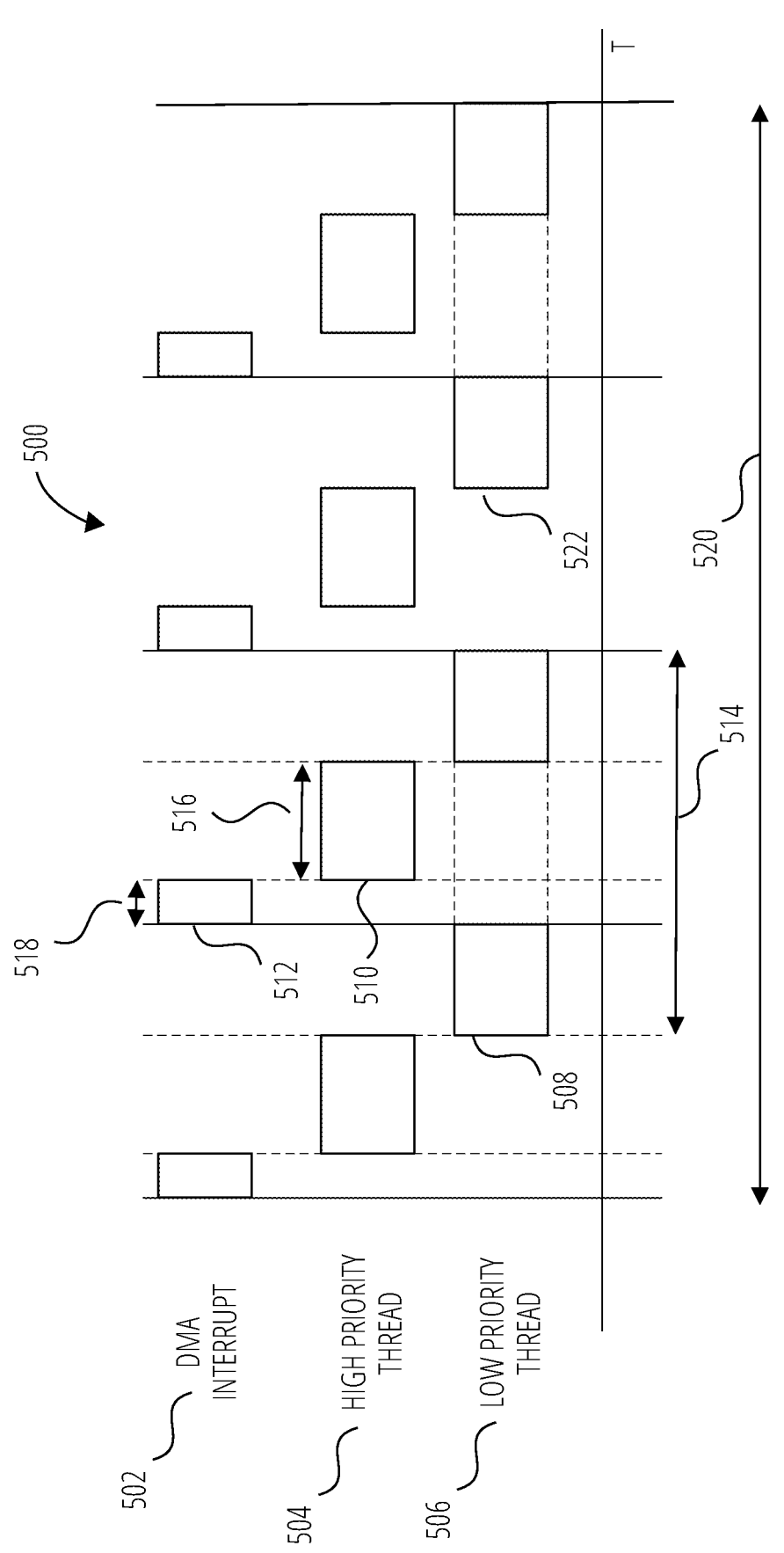
FIG. 5 is a chart illustrating thread propagation and preemption versus time, according to some examples.

FIG. 5 is a chart 500 illustrating thread propagation and preemption versus time, according to some examples. Shown in the chart is the processing of instances of a DMA interrupt 502, a high priority thread 504 and a low priority thread 506 versus time. The passage of time is marked by a cycle counter, which counts the number of elapsed cycles of the processor clock. The duration of a time interval can be determined by capturing the value of the cycle counter at the start of the interval, capturing the value of the cycle counter at the end of the interval, and subtracting the latter value from the former value.

Each thread (high priority thread 504 and low priority thread 506 in FIG. 5) maintains its own record of the values of the cycle counter at its start and end. The difference between these two values (that is, the apparent duration of the execution time for the thread) can then be passed to any lower priority thread that was preempted by that thread. The difference between the two values, adjusted for any preemption, can also be passed to the system to perform cycle profiling.

As can be seen in FIG. 5, a low priority thread instance 508 is preempted by a DMA instance 512 and also by a high priority thread instance 510. The total time 514 from the time the low priority thread instance 508 starts until it ends is not representative of the processing time that was dedicated to the low priority thread 506. Any loss of time 518 resulting from preemption by the DMA interrupt 502 cannot be determined, but in most systems this is negligible. Accordingly, an estimate of the processor time dedicated to the low priority thread instance 508 can be determined by subtracting the time 516 dedicated to the high priority thread instance 510 from the total time 514 dedicated to the low priority thread instance 508.

The amount of processing time dedicated to the low priority thread 506 over a certain time interval, for example time interval 520, can then be estimated or determined by adding the time dedicated to the low priority thread instances over that time interval, for example by adding together the net durations of low priority thread instance 508 and low priority thread instance 522 in FIG. 5. This sum can then be divided by the time interval 520 and expressed as a percentage, to determine the amount of processor capability dedicated to the low priority thread 506. This is done for each of the threads, and reported to the system 100 or a user or developer thereof.

Figure 6:
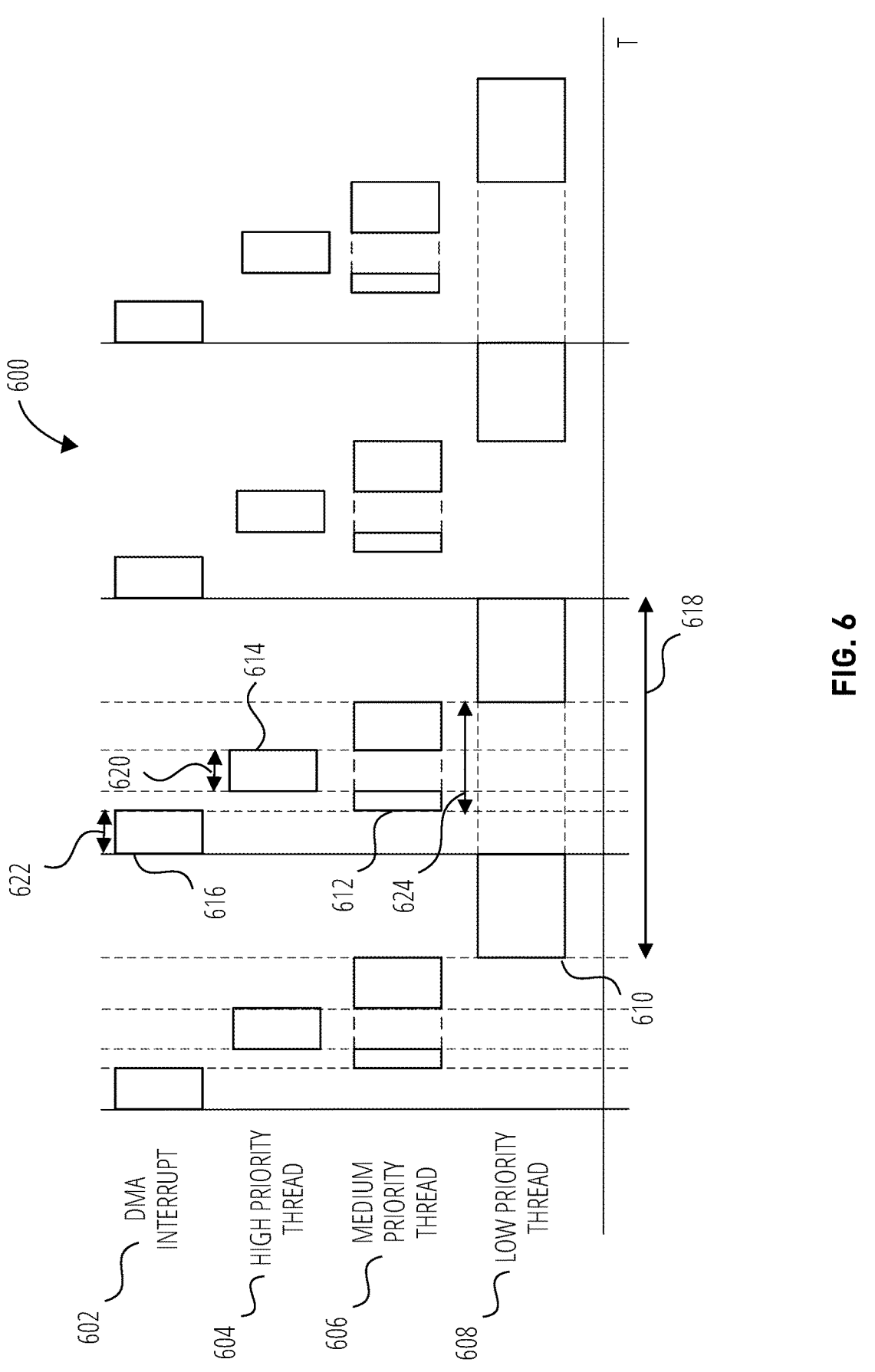
FIG. 6 is a chart illustrating thread propagation and preemption versus time, according to some examples.

FIG. 6 is a chart 600 illustrating thread propagation and preemption versus time, according to some examples. Shown in the chart is the processing of instances of a DMA interrupt 602, a high priority thread 604, a medium priority thread 606, and a low priority thread 608 versus time. As before, the passage of time is marked by a cycle counter, which counts the number of elapsed cycles of the processor clock. The length of a time interval can be determined by capturing the value of the cycle counter at the start of the interval, capturing the value of the cycle counter at the end of the interval, and subtracting the latter value from the former value.

Each thread maintains its own record of the values of the cycle counter at its start and end. The difference between these two values (that is, the duration of execution time for the thread) can then be passed to any lower priority thread that was preempted by that thread. The difference between the two values, adjusted for any preemption, can also be passed to the system to perform cycle profiling.

As can be seen in FIG. 6, a low priority thread instance 610 is preempted by a DMA instance 616 and also by a medium priority thread instance 612. The medium priority thread instance 612 is also preempted by a high priority thread instance 614.

The total time 618 from the time the low priority thread instance 610 starts until it ends is not representative of the processing time that was dedicated to the low priority thread 608. Any loss of time 622 resulting from preemption by the DMA interrupt 602 cannot be determined, but in most systems this is negligible.

Accordingly, an estimate of the processor time dedicated to the low priority thread instance 610 can again be determined by subtracting the total time 624 dedicated to the medium priority thread instance 612 from the total time 618 dedicated to the low priority thread instance 610. As can be seen, in determining the processor time dedicated to the low priority thread instance 610, it is not necessary to account for the time 620 lost by the medium priority thread instance 612 as a result of its preemption by the high priority thread instance 614, since that lost time is included in the total time 624 between when medium priority thread instance 612 begins and ends.

Similarly, an estimate of the processor time dedicated to the high priority thread instance 614 can be determined by subtracting the time 620 dedicated to the high priority thread instance 614 from the total time 624 dedicated to the medium priority thread instance 612.

In the event that low priority thread instance 610 is also preempted directly by high priority thread instance 614, for example after medium priority thread instance 612 ends but before low priority thread instance 610 ends, the duration of both the medium priority thread instance 612 and the duration of the high priority thread instance 614, also reported to low priority thread instance 610, will be subtracted from the total time 618 dedicated to the low priority thread instance 610. The lost times resulting from direct preemptions are thus accounted for in the determination, while the lost times resulting from indirect preemption are accounted for in the total duration of the directly-preempting thread.

Each thread instance thus keeps track of its total time (such as total time 624 for low priority thread instance 610 and total time 624 for medium priority thread instance 612) for reporting to any lower priority thread instances that have been preempted by that thread. Each thread instance also keeps track of the estimate of the actual processor time spent by that thread (total time 618 less total time 624 for low priority thread instance 610, and total time 624 less time 620 for medium priority thread instance 612) for reporting to the system for profiling purposes.

In the case of high priority thread instance 614, which has not been preempted by a higher priority thread, there is nothing to subtract and the actual processor time dedicated to the high priority thread instance 614 will be the same as the total time 620.

In some cases, the amount of time determined in this manner will be the actual time dedicated to a particular thread instance and not an estimate, for example when a thread instance is not preempted by an ISR, as for medium priority thread instance 612 and high priority thread instance 614 in FIG. 6.

The amounts of time estimated or determined in this manner for instances of each thread can be accumulated over a specified time interval as before. The percentage of processor time dedicated to the particular thread during the time window can then be determined by dividing the accumulated time by the size of the specified time window, expressed as a percentage.

FIG. 7 illustrates a flowchart 700 for providing cycle profiling according to some examples, performed at the thread instance level. For explanatory purposes, the operations of the flowchart 700 are described herein as occurring in serial, or linearly. However, multiple operations of the flowchart 700 may occur in parallel. In addition, the operations of the flowchart 700 need not be performed in the order shown and/or one or more blocks of the flowchart 700 need not be performed and/or can be replaced by other operations.

The method commences at operation 702 with a thread instance (for example thread instances 504, 506, 604, 606 or 608) beginning. The particular thread instance captures the cycle counter value at the beginning of the thread instance at operation 704, and thread instance processing begins at operation 706.

In the event that the thread instance is preempted at operation 708 by a higher priority thread instance, for example as described above with reference to FIG. 4A and FIG. 4B, and returned from the higher priority thread instance in operation 710, the preemption time is received from the preempting thread in operation 712. As discussed above, this is only done for the immediately-preempting thread, since the time consumed by any higher level threads that preempt the preempting thread will be included in the total time reported by the preempting thread. These optional operations may or may not occur for any particular thread instance, and are thus illustrated with dashed lines.

In operation 714, if processing of the thread instance is not complete, the method returns to processing of the thread instance in operation 706 and the method continues from there. If thread processing is complete, the cycle counter value at the end of the processing of the thread instance is captured in operation 716. The total thread instance time is determined in operation 718 as the difference between the cycle counter begin value and the cycle counter end value, In the event that the thread instance preempted another thread instance, and this total thread time is reported to the preempted thread in operation 720.

The net thread instance time is then determined in operation 722, as the difference between the total thread instance time determined in operation 718 and the sum of any preemption time(s) received in operation 712 from any preempting threads.

The net thread instance time and a thread identifier is then reported to the system in operation 724, and the thread instance then ends at operation 726.

Figure 8:
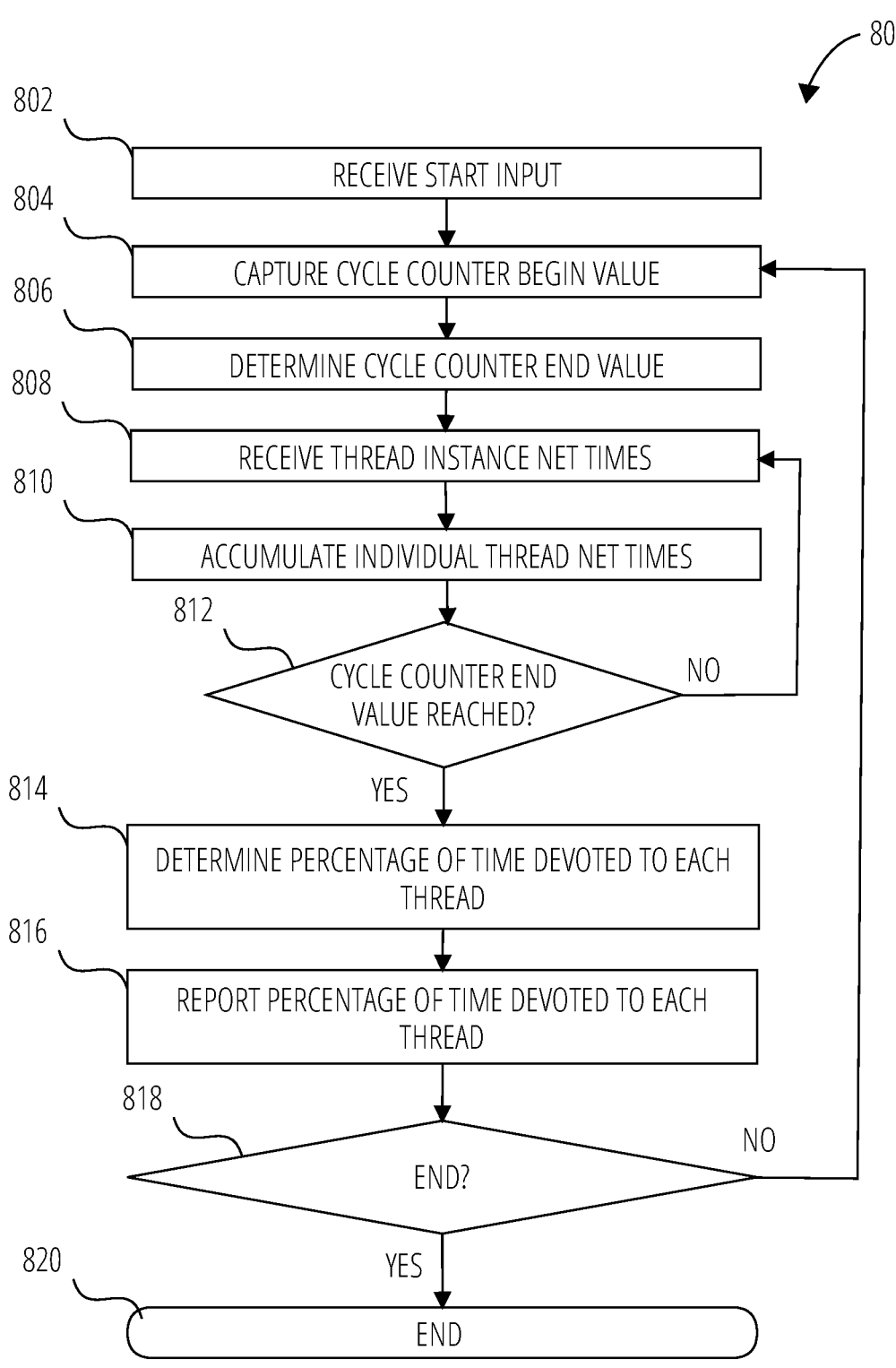
FIG. 8 illustrates a flowchart for providing cycle profiling according to some examples.

FIG. 8 illustrates a flowchart 800 for providing cycle profiling according to some examples, performed at the system level. For explanatory purposes, the operations of the flowchart 800 are described herein as occurring in serial, or linearly. However, multiple operations of the flowchart 800 may occur in parallel. In addition, the operations of the flowchart 800 need not be performed in the order shown and/or one or more blocks of the flowchart 800 need not be performed and/or can be replaced by other operations.

The method commences at operation 802, with receipt of start input at operation 802. This could for example be user input requesting a report of resource consumption from the system, or internal start input based on the commencement of audio processing, debugging and so forth. All cumulative thread time values are zeroed out at the start of the flowchart 800. The cycle counter begin value is captured in operation 804.

Associated with the method are one or more predetermined time windows or intervals having a specific duration over which the cycle profiling is to be performed. The flowchart 800 is performed for each interval in question. Different intervals will provide different short, medium term results, which may provide different insights as to the operation of the audio device 202. For a particular time interval, the cycle counter end value is determined in operation 806 by adding the specified size of the predetermined interval to the cycle counter begin value captured in operation 804.

Thread instance net times and thread identifiers are then received in operation 808 as determined and reported in operations 722 and 724 in flowchart 700. For each identified thread, a cumulative net time is then determined in operation 810 by adding the received instance thread times to a current total individual thread time.

In operation 812, the current cycle counter value is compared with the cycle counter end value determined in operation 806. If the end value has not been reached (that is, the current value is less than the end value), the method returns to operation 808 and proceeds from there with the receipt of further thread instance net times.

If the cycle counter end value has been reached in operation 812 (that is, the current value of the cycle counter is greater than or equal to the end value), the method proceeds at operation 814 with a determination, for each thread, of the percentage of the processor time devoted to that thread. This is done by dividing each accumulated individual thread time determined in operation 810 by the specific time interval under consideration, used to determine the end counter value in operation 806, expressed as a percentage.

The percentage of time devoted to each thread is then reported in operation 816. In some examples the report is provided in a user interface display to a user or developer, and in some examples the report is provided to the DSP framework 208, processor 206 or associated operating or management systems to facilitate resource allocation. The report may for example include the percentage of processor time devoted to each thread over different intervals, as well as moving averages and total or cumulative processor time for each thread.

In operation 818 it is determined whether or an event indicating the end of the flowchart 800 has occurred. This could for example be receipt of user input to end the reporting, the termination of audio processing, and so forth. If an end event has not occurred, the method returns to operation 804 and continues from there. If an end event has occurred, the flowchart 800 ends at operation 820.

Figure 9:
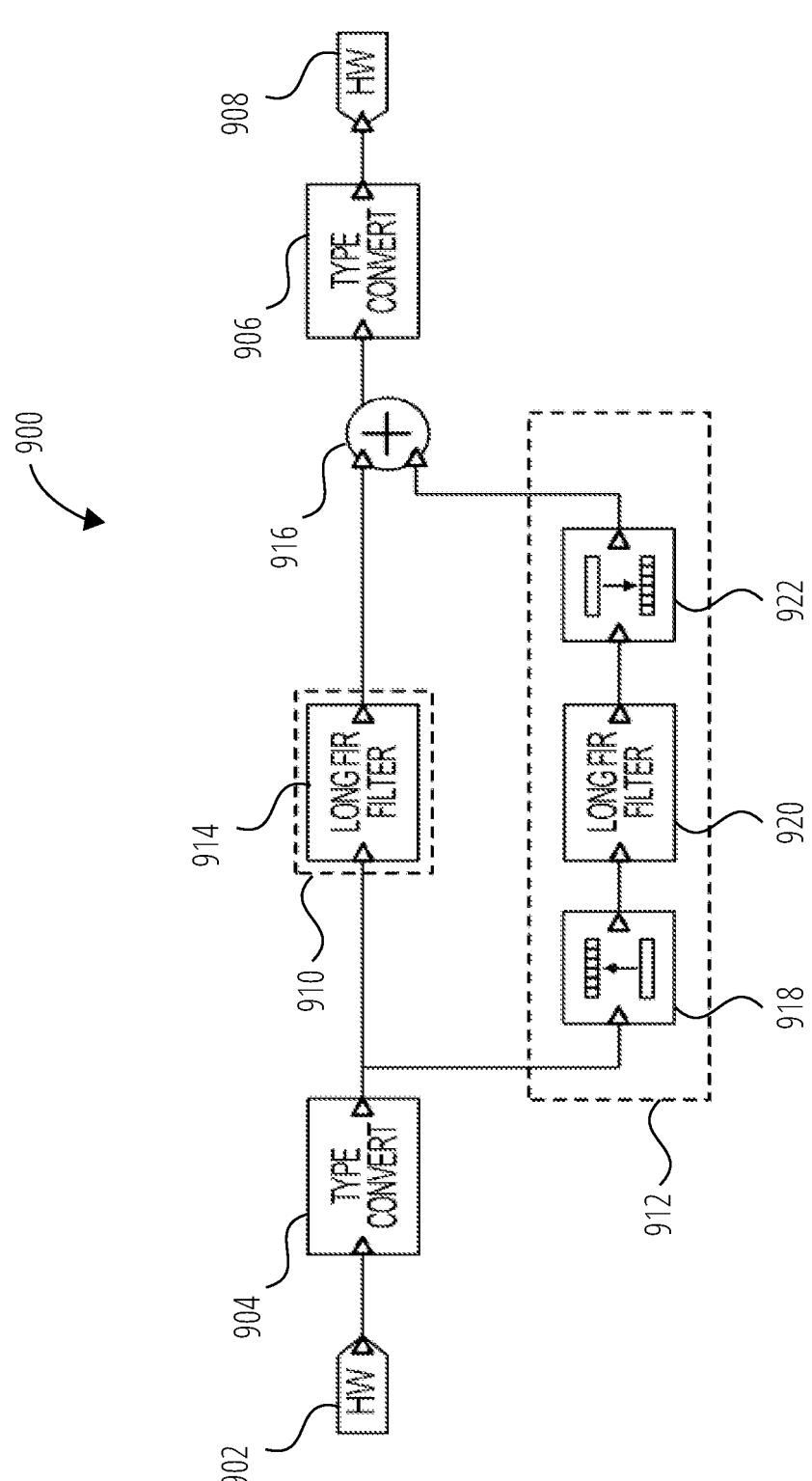
FIG. 9 illustrates a simple audio processing design according to some examples.

FIG. 9 illustrates a simple audio processing design 900 according to some examples. The design 900 is generated using a design interface on an audio design application running on a developer device such as computer 110. The design interface provides a number of audio modules that can be used to build up audio functions using a graphical user interface, similar to circuit design. The design interface permits selected audio modules to be placed in a design, modules to be interconnected, and the parameters of different modules to be specified.

Upon completion of the design 900, the application hosted by the developer device generates a corresponding binary file or netlist corresponding to the design 900, which can be embedded or downloaded to an audio product, to provide the specified audio processing in conjunction with the DSP framework 208.

It will be appreciated that the audio processing modules provided in the design interface are representations of the actual audio processing modules that are or may be available in the DSP framework 208, and are not the actual audio processing modules themselves. Associated with the representations of the audio processing modules used in the design interface is a collection of data that is used by the application hosted by the developer device to generate the binary fil, including an identification of the particular audio processing module in the core of the DSP framework 208, and its parameters. Unless the context indicates otherwise, "an audio processing module" for purposes of the design interface is understood, for the sake of convenience, to include "a representation of an audio processing module."

In the illustrated example, design 900 includes an input pin 902 that receives digital audio stream at an input block size of, for example, 32 samples. The digital audio stream is first converted into an appropriate format for processing by a type conversion 904 block. At the end of the design 900, similar operations occur in reverse, with the output digital audio stream being converted back into the system format by a type conversion 906 before being provided to an output pin 908.

The design 900 also includes two example threads-a first thread 910 and a second thread 912. The first thread 910 is a low latency path that implements an FIR filter module 914 using the 32 sample block size of the input audio data steam. The second thread 912 is a more efficient implementation in which an FIR filter module 920 operates on a 256 sample block size. To permit this to occur, the audio input stream is buffered up in start thread module 918 from 32 samples to 256 samples and is then buffered down from 256 samples back to 32 samples in stop thread module 922 to permit adding of the outputs of the two threads at adder 916. As is known in the art, buffering up and down in this manner introduces a latency that is equal to twice the larger block size. In design 900, the added latency is thus 512 samples. The second thread 912 runs at a lower priority in both single and multicore systems.

The priority of thread execution depends on the integer thread number and an alphabetical subordinate thread ID letter. All subordinate threads operating on the block size of the input stream have a thread number of 1. The thread number for all other threads corresponds to the buffer up factor specifying how far the thread has been buffered up from the block size of the input stream. So, using the example above, all subordinate threads operating on the 32 sample input block size will have a thread number of 1, threads operating on a 64 sample block size (buffered up by factor of 2 from the input sample block size) will have a thread number of 2, subordinate threads operating on a 256 sample block size (buffered up factor of 8 from the input sample block size) will have a thread number of 8, and so forth.

Integer values corresponding to multiples of input block sizes is also known as the "clock divider." So a thread that is buffered up by a factor of 2 from the input sample block size will have a thread number of 2 which is also a multiple of 2 of the clock divider. The thread number downstream of a start thread module also depends on the thread number at the input to the start thread module. So, for example, if a start thread module has an input thread with a thread number of 2 and the start thread module has a buffer up factor of 4, the thread number exiting the start thread module will be 8, since the sample block size received at the start thread module will be at a 64 sample block size (buffered up twice already), which is then buffered up by a factor of 4 to a 256 sample block size, or buffered up by factor of 8 from the input sample block size. The thread number is thus typically the input thread number of the start thread module multiplied by the buffer up factor.

The initial priority of thread processing is based on the thread number, so that all subordinate threads in thread 1 will have a higher priority than subordinate threads having a higher thread number. The priority of subordinate threads in the same thread will depend on the alphabetical thread subordinate ID, which is user-specified. So subordinate thread 1C has a higher priority than subordinate thread 2A but has a lower priority than subordinate thread 1B. That is, multiple subordinate threads at the same block size are permitted, and priority of the subordinate threads within the thread is based on the letter of the alphabet within that thread.

For the purposes of cycle profiling disclosed herein, a subordinate thread is tracked as a separate thread, although cycle profiling can also be done by grouping times associated with processing subordinate threads together under a common thread number.

The start thread module 918 and stop thread module 922 include a number of parameters and features. In particular, a) the number of input and output pins can be specified for both the start thread module 918 and the stop thread module 922, b) a buffer up factor can be specified for a start thread module 918, c) a buffer down factor can be specified for the stop thread module, and a thread subordinate ID can be specified in the start thread module 918. Furthermore, each thread and subordinate thread includes a variable for storing the value of the cycle counter at the start of execution of the thread (or subordinate thread), the value of the cycle counter at the end of execution of the thread, as well as variables for receiving and processing thread intervals from preempting threads.

Figure 10:
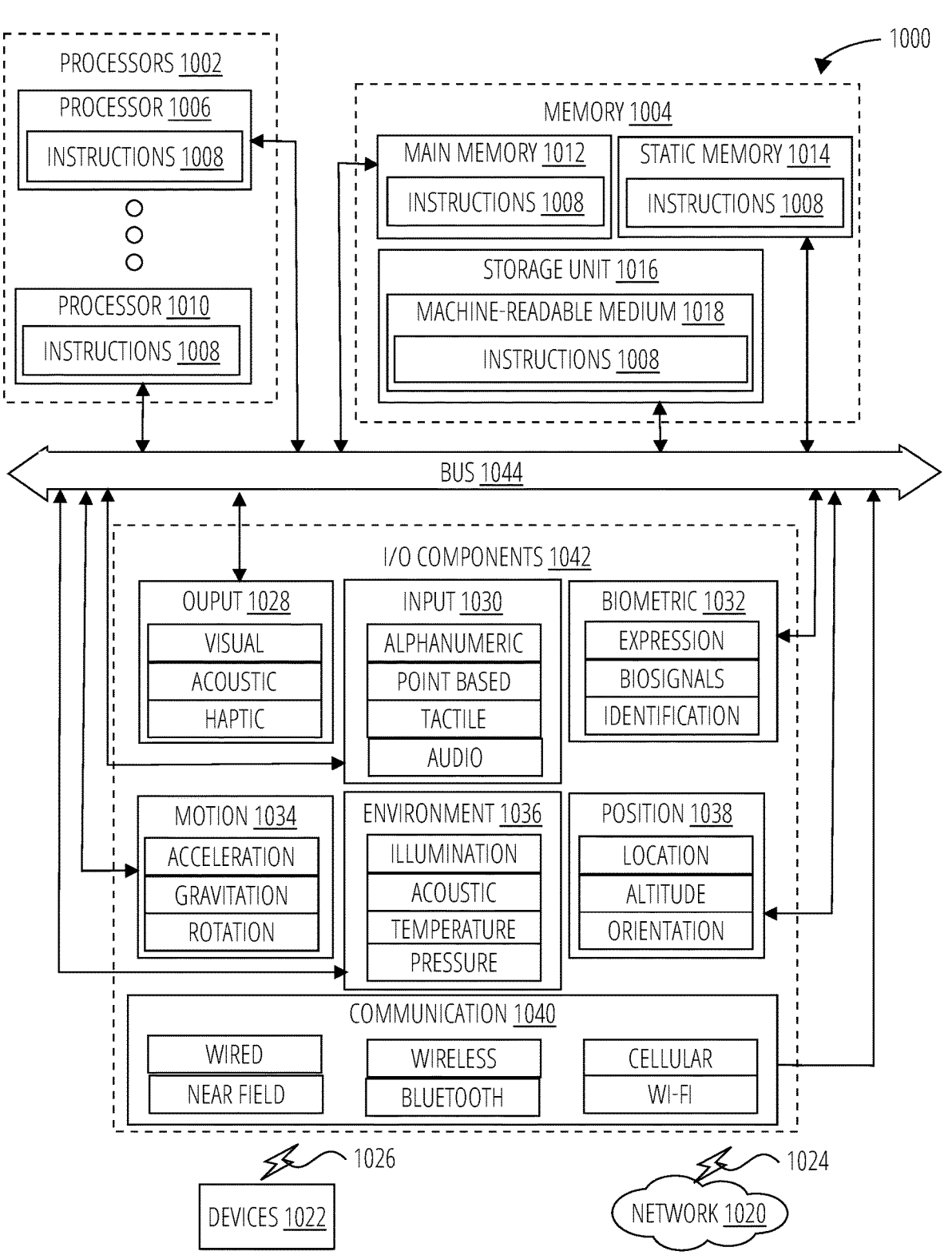
FIG. 10 illustrates a diagrammatic representation of a machine in the form of a computer system within which a set of instructions may be executed for causing the machine to perform any one or more of the methodologies discussed herein, according to some examples.

FIG. 10 illustrates a diagrammatic representation of a machine 1000 in the form of a computer system within which a set of instructions may be executed for causing the machine to perform any one or more of the methodologies discussed herein, according to some examples. Specifically, FIG. 10 shows a diagrammatic representation of the machine 1000 in the example form of a computer system, within which instructions 1008 (e.g., software, a program, an application, an applet, an app, or other executable code) for causing the machine 1000 to perform any one or more of the methodologies discussed herein may be executed. For example the instructions 1008 may cause the machine 1000 to execute the methods described above. The instructions 1008 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, which specify actions to be taken by the machine 1000. Further, while only a single machine 1000 is illustrated, the term "machine" shall also be taken to include a collection of machines 1000 that individually or jointly execute the instructions 1008 to perform any one or more of the methodologies discussed herein.

The machine 1000 may include processors 1002, memory 1004, and I/O components 1042, which may be configured to communicate with each other such as via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that may execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 may include a main memory 1012, a static memory 1014, and a storage unit 1016, both accessible to the processors 1002 such as via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones will likely include a touch input device or other such input mechanisms, while a headless server machine will likely not include such a touch input device. It will be appreciated that the I/O components 1042 may include many other components that are not shown in FIG. 10. The I/O components 1042 are grouped according to functionality merely for simplifying the following discussion and the grouping is in no way limiting. In various example embodiments, the I/O components 1042 may include output components 1028 and input components

1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 may include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or utilized by any one or more of the methodologies or functions described herein. These instructions (e.g., the instructions 1008), when executed by processors 1002, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1020 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1020 or a portion of the network 1020 may include a wireless or cellular network, and the coupling 1024 may be a Code Division Multiple Access (CDMA) connection, a Global System for Mobile communications (GSM) connection, or another type of cellular or wireless coupling. In this example, the coupling 1024 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1008 may be transmitted or received over the network 1020 using a transmission medium via a network interface device (e.g., a network interface component included in the communication components 1040) and utilizing any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1008 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method, executed by one or more processors, of processing at least a first thread and a second thread, the method comprising:

determining, by the first thread, a clock value at the start of execution of the first thread;

beginning processing the first thread;

receiving preemption of the first thread by a second thread;

determining, by the second thread, a clock value at the start of execution of the second thread;

processing the second thread;

determining, by the second thread, a clock value at the end of execution of the second thread;

determining, by the second thread, a duration of the second thread by subtracting the clock value at the start of execution of the second thread from the clock value at the end of execution of the second thread;

passing the duration of the second thread to the first thread;

completing processing of the first thread;

determining, by the first thread, a clock value at the end of execution of the first thread; and determining, by the first thread, a duration of the first thread by subtracting the duration of the second thread from a difference between the clock value at the end of execution of the first thread and the clock value at the start of execution of the first thread.

2. The method of claim 1 further comprising, during processing of the second thread:

receiving preemption of the second thread by a third thread;

determining, by the third thread, a clock value at the start of execution of the third thread;

processing the third thread;

determining, by the third thread, a clock value at the end of execution of the third thread;

determining, by the third thread, a duration of the third thread by subtracting the clock value at the start of execution of the third thread from the clock value at the end of execution of the third thread;

passing the duration of the third thread to the second thread; and completing processing of the second thread;

wherein determining the duration of the second thread by the second thread comprises subtracting the duration of the third thread from the difference between the clock value at the end of execution of the second thread and the clock value at the start of execution of the second thread.

3. The method of claim 2, further comprising:

performing the method over a predetermined interval having a specific duration;

accumulating durations of the first thread and durations of the second thread that have been determined during the predetermined interval;

determining a processor load for the first thread by dividing the accumulated duration of the first thread by the specific duration;

determining a processor load for the second thread by dividing the accumulated duration of the second thread by the specific duration; and reporting the processor load for the first thread and the processor load for the second thread.

4. The method of claim 2, further comprising:

performing the method over a predetermined interval having a specific duration;

accumulating durations of the first thread and durations of the second thread and durations of the third thread that have been determined during the predetermined interval;

determining a processor load for the first thread by dividing the accumulated duration of the first thread by the specific duration;

determining a processor load for the second thread by dividing the accumulated duration of the second thread by the specific duration;

determining a processor load for the third thread by dividing the accumulated duration of the third thread by the specific duration; and reporting the processor loads for the first thread, the second thread and the third thread.

5. The method of claim 1 further comprising, during processing of the first thread:

receiving preemption of the first thread by a third thread;

determining, by the third thread, a clock value at the start of execution of the third thread;

processing the third thread;

determining, by the third thread, a clock value at the end of execution of the third thread;

determining, by the third thread, a duration of the third thread by subtracting the clock value at the start of execution of the third thread from the clock value at the end of execution of the third thread;

passing the duration of the third thread to the first thread; and completing processing of the first thread;

wherein determining the duration of the first thread by the first thread comprises subtracting the duration of the second thread and the duration of the third thread from the difference between the clock value at the end of execution of the first thread and the clock value at the start of execution of the first thread.

6. The method of claim 5, further comprising:

performing the method over a predetermined interval having a specific duration;

accumulating durations of the first thread and durations of the second thread that have been determined during the predetermined interval;

determining a processor load for the first thread by dividing the accumulated duration of the first thread by the specific duration;

determining a processor load for the second thread by dividing the accumulated duration of the second thread by the specific duration; and reporting the processor load for the first thread and the processor load for the second thread.

7. The method of claim 5, further comprising:

performing the method over a predetermined interval having a specific duration;

accumulating durations of the first thread and durations of the second thread and durations of the third thread that have been determined during the predetermined interval;

determining a processor load for the first thread by dividing the accumulated duration of the first thread by the specific duration;

determining a processor load for the second thread by dividing the accumulated duration of the second thread by the specific duration;

determining a processor load for the third thread by dividing the accumulated duration of the third thread by the specific duration; and reporting the processor loads for the first thread, the second thread and the third thread.

8. The method of claim 1, further comprising:

performing the method over a predetermined interval having a specific duration;

accumulating durations of the first thread and durations of the second thread that have been determined during the predetermined interval;

determining a processor load for the first thread by dividing the accumulated duration of the first thread by the specific duration;

determining a processor load for the second thread by dividing the accumulated duration of the second thread by the specific duration; and reporting the processor load for the first thread and the processor load for the second thread.

9. A non-transitory computer-readable storage medium, the computer-readable storage medium including instructions that when executed by a computer, cause the computer to process at least a first thread and a second thread by performing operations comprising:

determining, by the first thread, a clock value at the start of execution of the first thread;

beginning processing the first thread;

receiving preemption of the first thread by a second thread;

determining, by the second thread, a clock value at the start of execution of the second thread;

processing the second thread;

determining, by the second thread, a clock value at the end of execution of the second thread;

determining, by the second thread, a duration of the second thread by subtracting the clock value at the start of execution of the second thread from the clock value at the end of execution of the second thread;

passing the duration of the second thread to the first thread;

completing processing of the first thread;

determining, by the first thread, a clock value at the end of execution of the first thread; and determining, by the first thread, a duration of the first thread by subtracting the duration of the second thread from a difference between the clock value at the end of execution of the first thread and the clock value at the start of execution of the first thread.

10. The non-transitory computer-readable storage medium of claim 9, wherein the operations further comprise, during processing of the second thread:

receiving preemption of the second thread by a third thread;

determining, by the third thread, a clock value at the start of execution of the third thread;

processing the third thread;

determining, by the third thread, a clock value at the end of execution of the third thread;

determining, by the third thread, a duration of the third thread by subtracting the clock value at the start of execution of the third thread from the clock value at the end of execution of the third thread;

passing the duration of the third thread to the second thread; and completing processing of the second thread;

wherein determining the duration of the second thread by the second thread comprises subtracting the duration of the third thread from the difference between the clock value at the end of execution of the second thread and the clock value at the start of execution of the second thread.

11. The non-transitory computer-readable storage medium of claim 10, wherein the operations further comprise:

performing the operations over a predetermined interval having a specific duration;

accumulating durations of the first thread and durations of the second thread that have been determined during the predetermined interval;

determining a processor load for the first thread by dividing the accumulated duration of the first thread by the specific duration;

determining a processor load for the second thread by dividing the accumulated duration of the second thread by the specific duration; and reporting the processor load for the first thread and the processor load for the second thread.

12. The non-transitory computer-readable storage medium of claim 9, wherein the operations further comprise, during processing of the first thread:

receiving preemption of the first thread by a third thread;

determining, by the third thread, a clock value at the start of execution of the third thread;

processing the third thread;

determining, by the third thread, a clock value at the end of execution of the third thread;

determining, by the third thread, a duration of the third thread by subtracting the clock value at the start of execution of the third thread from the clock value at the end of execution of the third thread;

passing the duration of the third thread to the first thread; and completing processing of the first thread;

wherein determining the duration of the first thread by the first thread comprises subtracting the duration of the second thread and the duration of the third thread from the difference between the clock value at the end of execution of the first thread and the clock value at the start of execution of the first thread.

13. The non-transitory computer-readable storage medium of claim 12, wherein the operations further comprise:

performing the operations over a predetermined interval having a specific duration;

accumulating durations of the first thread and durations of the second thread that have been determined during the predetermined interval;

determining a processor load for the first thread by dividing the accumulated duration of the first thread by the specific duration;

determining a processor load for the second thread by dividing the accumulated duration of the second thread by the specific duration; and reporting the processor load for the first thread and the processor load for the second thread.

14. The non-transitory computer-readable storage medium of claim 9, wherein the operations further comprise:

performing the operations over a predetermined interval having a specific duration;

accumulating durations of the first thread and durations of the second thread that have been determined during the predetermined interval;

determining a processor load for the first thread by dividing the accumulated duration of the first thread by the specific duration;

determining a processor load for the second thread by dividing the accumulated duration of the second thread by the specific duration; and reporting the processor load for the first thread and the processor load for the second thread.

15. A computing apparatus comprising:

a processor; and a memory storing instructions that, when executed by the processor, configure the apparatus to process at least a first thread and a second thread by performing operations comprising:

determining, by the first thread, a clock value at the start of execution of the first thread;

beginning processing the first thread;

receiving preemption of the first thread by a second thread;

determining, by the second thread, a clock value at the start of execution of the second thread;

processing the second thread;

determining, by the second thread, a clock value at the end of execution of the second thread;

determining, by the second thread, a duration of the second thread by subtracting the clock value at the start of execution of the second thread from the clock value at the end of execution of the second thread;

passing the duration of the second thread to the first thread;

completing processing of the first thread;

determining, by the first thread, a clock value at the end of execution of the first thread; and determining, by the first thread, a duration of the first thread by subtracting the duration of the second thread from a difference between the clock value at the end of execution of the first thread and the clock value at the start of execution of the first thread.

16. The computing apparatus of claim 15, wherein the operations further comprise, during processing of the second thread:

receiving preemption of the second thread by a third thread;

determining, by the third thread, a clock value at the start of execution of the third thread;

processing the third thread;

determining, by the third thread, a clock value at the end of execution of the third thread;

determining, by the third thread, a duration of the third thread by subtracting the clock value at the start of execution of the third thread from the clock value at the end of execution of the third thread;

passing the duration of the third thread to the second thread; and completing processing of the second thread;

wherein determining the duration of the second thread by the second thread comprises subtracting the duration of the third thread from the difference between the clock value at the end of execution of the second thread and the clock value at the start of execution of the second thread.

17. The computing apparatus of claim 16, wherein the operations further comprise:

performing the operations over a predetermined interval having a specific duration;

accumulating durations of the first thread and durations of the second thread and durations of the third thread that have been determined during the predetermined interval;

determining a processor load for the first thread by dividing the accumulated duration of the first thread by the specific duration;

determining a processor load for the second thread by dividing the accumulated duration of the second thread by the specific duration;

determining a processor load for the third thread by dividing the accumulated duration of the third thread by the specific duration; and reporting the processor loads for the first thread, the second thread and the third thread.

18. The computing apparatus of claim 15, wherein the operations further comprise, during processing of the first thread:

receiving preemption of the first thread by a third thread;

determining, by the third thread, a clock value at the start of execution of the third thread;

processing the third thread;

determining, by the third thread, a clock value at the end of execution of the third thread;

determining, by the third thread, a duration of the third thread by subtracting the clock value at the start of execution of the third thread from the clock value at the end of execution of the third thread;

passing the duration of the third thread to the first thread; and completing processing of the first thread;

wherein determining the duration of the first thread by the first thread comprises subtracting the duration of the second thread and the duration of the third thread from the difference between the clock value at the end of execution of the first thread and the clock value at the start of execution of the first thread.

19. The computing apparatus of claim 18, wherein the operations further comprise:

performing the operations over a predetermined interval having a specific duration;

accumulating durations of the first thread and durations of the second thread and durations of the third thread that have been determined during the predetermined interval;

determining a processor load for the first thread by dividing the accumulated duration of the first thread by the specific duration;

determining a processor load for the second thread by dividing the accumulated duration of the second thread by the specific duration;

determining a processor load for the third thread by dividing the accumulated duration of the third thread by the specific duration; and reporting the processor loads for the first thread, the second thread and the third thread.

20. The computing apparatus of claim 15, wherein the operations further comprise:

performing the operations over a predetermined interval having a specific duration;

accumulating durations of the first thread and durations of the second thread that have been determined during the predetermined interval;

determining a processor load for the first thread by dividing the accumulated duration of the first thread by the specific duration;

determining a processor load for the second thread by dividing the accumulated duration of the second thread by the specific duration; and reporting the processor load for the first thread and the processor load for the second thread.

* * * * *